(12) United States Patent
Sato et al.

(10) Patent No.: US 7,746,930 B2
(45) Date of Patent: Jun. 29, 2010

(54) MOTION PREDICTION COMPENSATING DEVICE AND ITS METHOD

(75) Inventors: Kazushi Sato, Chiba (JP); Toshiharu Tsuchiya, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1275 days.

(21) Appl. No.: 10/832,085

(22) Filed: Apr. 26, 2004

(65) Prior Publication Data

US 2004/0264572 A1 Dec. 30, 2004

(30) Foreign Application Priority Data

Apr. 28, 2003 (JP) ............................... 2003-123976

(51) Int. Cl.
*H04N 7/18* (2006.01)
(52) U.S. Cl. .............................. 375/240.16; 375/240.17
(58) Field of Classification Search ................................. 375/240.16–240.17
See application file for complete search history.

(56) References Cited

U.S. PATENT DOCUMENTS 5,357,287 A * 10/1994 Koo et al. .................... 348/699
5,467,086 A * 11/1995 Jeong .......................... 341/50
6,212,237 B1 * 4/2001 Minami et al. ......... 375/240.16
6,339,656 B1 * 1/2002 Marui ........................ 382/236
6,348,954 B1 * 2/2002 Takishima et al. ........... 348/699
7,099,392 B2 * 8/2006 Kim ....................... 375/240.16

FOREIGN PATENT DOCUMENTS

| JP | 09-238346 | 9/1997 |
| JP | 09-261646 | 10/1997 |
| JP | 2000-134628 | 5/2000 |

OTHER PUBLICATIONS

ISO/IEC 1/4 496-10: 2002(E).

* cited by examiner

*Primary Examiner*—Andy S Rao
(74) *Attorney, Agent, or Firm*—Finnegan, Henderson, Farabow, Garrett and Dunner, L.L.P.

(57) ABSTRACT

An object of the invention is to provide a prediction compensation device and its method in which the processing efficiency of the overall coding process is enhanced. The address of an object pixel block serving as a pixel block of prediction object among a plurality of pixel blocks is detected, a first search range or a second search range narrower than the first search range is decided as the search range of a motion vector for the object pixel block on the reference frame according to the detected address, and the motion vector is searched for from the decided search range around the predictor of the motion vector based on the surrounding pixel blocks adjacent to the object pixel block.

2 Claims, 7 Drawing Sheets

MOTION PREDICTION COMPENSATING DEVICE AND ITS METHOD

FIELD OF THE INVENTION

The present invention relates to a motion prediction compensating device and a motion prediction compensating method, and is suitably applied to a coding device with a predetermined coding method.

DESCRIPTION OF THE RELATED ART

An image coding device makes a coding process conforming to a predetermined image coding method for the dynamic image data supplied from the outside to generate the coded data with reduced data amount of the dynamic image data.

Such image coding methods include an image coding method called MPEG that is standardized to encode a general-purpose image by ISO/IEC Moving Picture Experts Group (MPEG) and an image coding method called H.26x (H.261, H.263, . . . ) that is standardized to encode a television conference image by the ITU group, which are well known.

In recent years, with the spread of portable terminal units such as portable telephone sets, there is a need for an image coding method that implements higher coding efficiency. At present, to cope with this need, an image coding method called Joint Model of Enhanced-Compression Video Coding (JVT) (hereinafter referred to as a JVT coding method) is standardized by the MPEG and ITU group.

In this JVT coding method, a process for predicting a motion amount of an object frame in the consecutive frames (dynamic images) employing a reference frame in the future or past for the object frame (hereinafter referred to as a motion prediction compensation process) is performed by searching the motion vector in the pixel block of prediction object (hereinafter referred to as a motion compensation block) at each of four block sizes, including 16×16 pixels, 8×16 pixels, 16×8 pixels and 8×8 pixels, as shown in FIG. 1. Thereby, the motion vectors are provided independently for the motion compensation blocks of four block sizes.

In addition, for the motion compensation block having a block size of 8×8 pixels, the motion vector is searched at each of four block sizes, including 8×8 pixels, 4×8 pixels, 8×4 pixels and 4×4 pixels, whereby the motion vectors are provided independently for the motion compensation blocks of four block sizes.

In this case, in the JVT coding method, after the frame is divided into macro blocks, for each of the macro blocks, the motion vector is searched while sequentially changing the motion compensation block at plural block sizes, whereby a maximum of 16 motion vectors are provided (e.g., refer to non-patent document 1: DRAFT ISO/IEC 1/4 496-10: 2002 (E)).

Also, in the JVT coding method, the prediction compensation process is performed for the motion compensation block within the object frame OF, employing a plurality of reference frames SF2 and SF5, or for the motion compensation blocks at different positions within the object frame OF, employing separate reference frames SF2 and SF4, in which the plurality of reference frames SF1 to SF5 are called a multi reference frame, as shown in FIG. 2 (e.g., refer to Non-Patent Document 1: DRAFT ISO/IEC 1/4 496-10: 2002(E))

By the way, in the coding device conforming to the JVT coding method, for all the macro blocks, the motion vector is searched employing the plurality of reference frames while sequentially changing the motion compensation block at plural block sizes, whereby the processing load in the motion prediction compensation process is increased over the already standardized coding method.

Also, the coding device conforming to the already standardized coding method has typically the greatest processing load in the motion prediction compensation process of the coding process.

Accordingly, if the processing load of this motion prediction compensation process is reduced without lowering the prediction precision, the processing efficiency over the overall coding process is possibly enhanced.

SUMMARY OF THE INVENTION

In view of the foregoing, an object of this invention is to provide a prediction compensating device and its method in which the processing efficiency over the overall coding process is enhanced.

The foregoing object and other objects of the invention have been achieved by the provision of a motion prediction compensating device comprising address detecting means for detecting the address of an object pixel block serving as a pixel block of prediction object among plural pixel blocks, search range deciding means for deciding a first search range or a second search range narrower than the first search range as the search range of a motion vector for the object pixel block in the reference frame in accordance with the address detected by the address detecting means, and motion vector searching means for searching for the motion vector from the search range decided by the search range deciding means around a predictor of the motion vector generated based on the surrounding pixel blocks adjacent to the object pixel block.

Consequently, in this motion prediction compensating device, the processing load is reduced because the motion vector is searched in the second search range narrower than the first motion search range, and the lower prediction precision is prevented because the motion vector is searched around the predictor reflecting the tendency of motion surrounding the prediction block.

Also, this invention provides a motion prediction compensating method comprising a first step of detecting an address of an object pixel block serving as a pixel block of prediction object among the plural pixel blocks, a second step of deciding a first search range or a second search range narrower than the first search range as the search range of a motion vector for the object pixel block in the reference frame in accordance with the address detected at the first step, and a third step of searching the motion vector from the search range decided at the second step around a predictor of the motion vector generated based on the surrounding pixel blocks adjacent to the object pixel block.

Consequently, in this motion prediction compensating method, the processing load is reduced because motion vector is searched in the second search range narrower than the first motion search range, and the lower prediction precision is prevented because the motion vector is searched around the predictor reflecting the tendency of motion surrounding the prediction block.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a diagrammatic view for explaining a search sequence of the motion vector;

FIG. 7 is a diagrammatic view for explaining a motion search at fractional pixel precision;

DETAILED DESCRIPTION OF THE PREFERRED EMBODIMENT

Preferred embodiments of this invention will be described with reference to the accompanying drawings:

(1) Outline of JVT Coding Method

Figure 1:
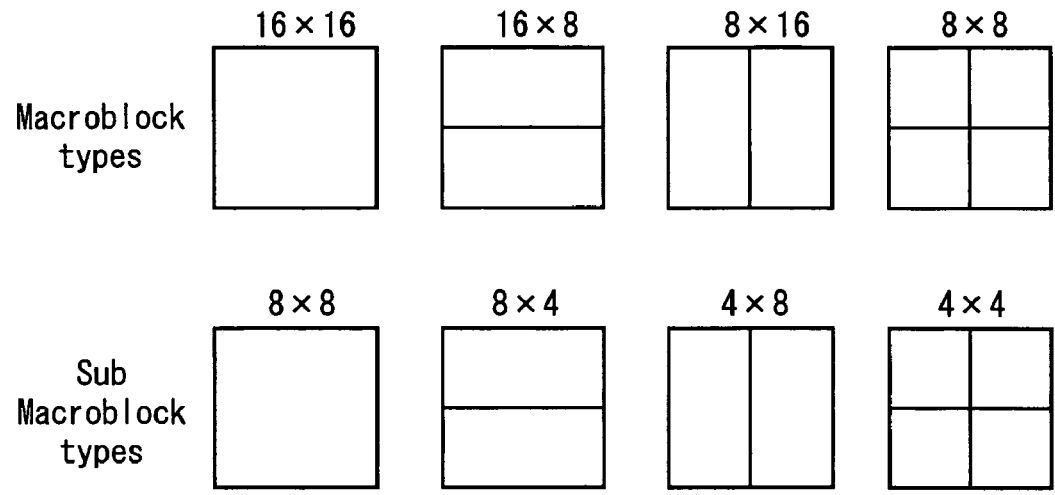
FIG. 1 is a diagrammatic view for explaining a motion compensation block.

In the JVT coding method, after dividing the frame into macro blocks, a motion prediction compensation process is performed while sequentially changing the motion compensation block having block sizes less than or equal to the size of macro block, as shown in FIG. 1 and described above.

This motion compensation prediction process is largely classified into a process for detecting the motion vector for the motion compensation block (hereinafter referred to a motion prediction process) and a process for shifting the pixels of the motion compensation block in accordance with the detected motion vector (hereinafter referred to as a motion compensation process).

In the JVT coding method, this motion compensation process is performed at ¼ pixel precision or ⅛ pixel precision.

Figure 3:
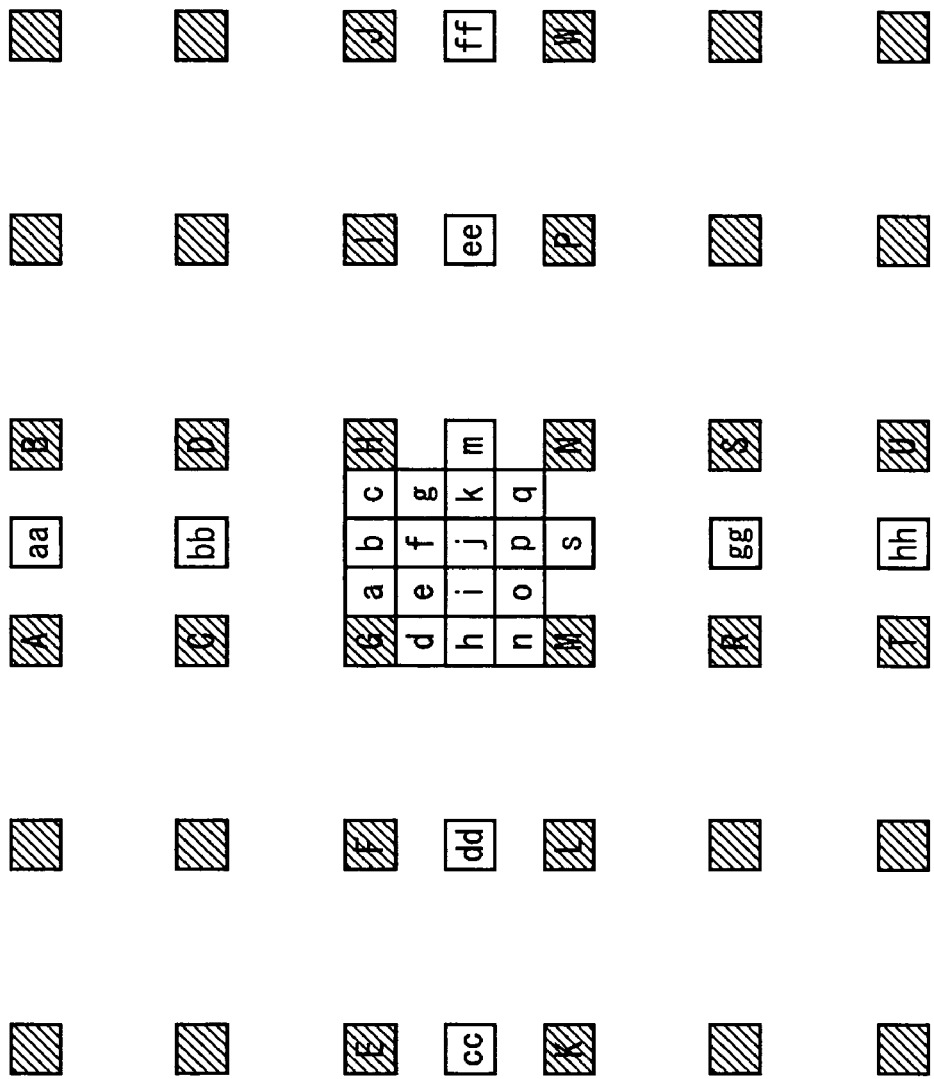
FIG. 3 is a diagrammatic view for explaining the motion compensation at ¼ pixel precision for a brightness signal component.

Referring to FIG. 3, the motion compensation process at ¼ pixel precision for a brightness component signal will be described below. In FIG. 3, the block with slant is represented as integer pixel, and the block without slant is represented as ½ pixel.

In the JVT coding method, the FIR filter is employed to generate the pixel value of ½ pixel, six tap filter coefficients being defined according to the following Formula.

$$\{-1, 5, 20, 20, 5, 1\} \quad (1)$$

In FIG. 3, the pixel values b and h of ½ pixel are calculated by adding up employing the filter coefficients of Formula (1) according to the following Formula, $$b = (E - 5F + 20G + 20H - 5H + J)$$

$$h = (A - 5C + 20G + 20M - 5R + T) \quad (2)$$

and making the arithmetical operation according to the following Formula $$b = \text{Clip1}((b+16) \gg 5)$$

$$h = \text{Clip1}((h+16) \gg 5) \quad (3)$$

This Clip 1 indicates the clip in (0, 255).

Also, the pixel value j is calculated by generating the pixel values aa, bb, cc, dd, ff, gg and hh in the same way as b and h, adding up according to the following formula $$j = cc - 5dd + 20h + 20m - 5ee + ff$$

Or $$j = aa - 5bb + 20b + 20s - 5rr + hh \quad (4)$$

and performing the clip process in the following way.

$$j = \text{Clip1}((j+512) \gg 10) \quad (5)$$

Also, the pixel values a, c, d, n, f, i, k and q are calculated through linear interpolation of the pixel values of integer pixel and the pixel values of ½ pixel according to the following Formula.

$$a = (G + b + 1) \gg 1$$

$$c = (H + b + 1) \gg 1$$

$$d = (G + h + 1) \gg 1$$

$$n = (M + h + 1) \gg 1$$

$$f = (c + j + 1) \gg 1$$

$$i = (h + j + 1) \gg 1$$

$$k = (j + m + 1) \gg 1$$

$$q = (j + s + 1) \gg 1 \quad (6)$$

Also, the pixel values e, g, p and r are calculated through linear interpolation employing the pixel values of ½ pixel according to the following Formula $$e = (b + h + 1) \gg 1$$

$$g = (b + m + 1) \gg 1$$

$$p = (h + s + 1) \gg 1$$

$$r = (m + s + 1) \gg 1 \quad (7)$$

Figure 4:
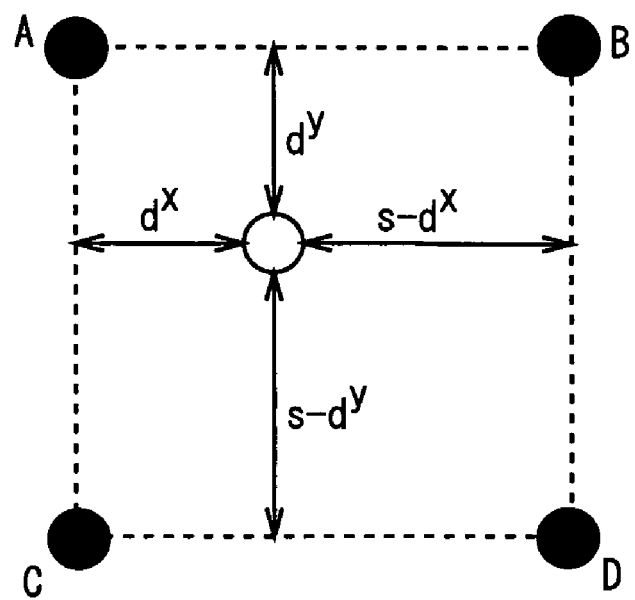
FIG. 4 is a diagrammatic view for explaining the motion compensation at ¼ pixel precision for a color difference signal component.

On the other hand, the motion prediction process for color difference signal is performed through linear interpolation according to the Formula 8, as shown in FIG. 4, for both cases of the motion prediction process at ¼ pixel precision and the motion prediction process at ⅛ pixel precision, $$v = \frac{(s-d^x)(s-d^y)A + d^x(s-d^y) + (s-d^x)d^yC + d^xd^yD + s^2/2}{s^2} \quad (8)$$

The motion prediction process as defined in the JVT coding method will be described below.

The motion vector information generated through this motion prediction process is represented as the difference information between the predictor based on the motion vector already detected for the surrounding motion compensation blocks adjacent to the motion compensation block of prediction object and the motion vector for the motion compensation block of prediction object.

Figure 5:
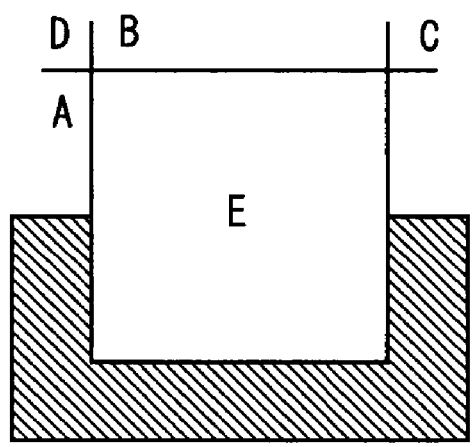
FIG. 5 is a diagrammatic view for explaining the generation of a predictor for the motion vector.

Referring to FIG. 5, a method for generating the predictor of motion vector for the motion compensation block E will be described below. The alphabets as denoted in FIG. 5 have no relevance with the alphabets as denoted in FIG. 3.

In FIG. 5, when the motion compensation block C does not exist within the picture or slice, or when the information is not "available" in respect of the decoding sequence within the macro block, the predictor is generated based on the value of motion vector regarding the motion compensation block D and the reference frame index.

When none of the motion compensation blocks B, C and D exist within the picture or slice, the predictor is generated based on the value of motion vector regarding the motion compensation block D and the reference frame index.

In other than the above cases, when the adjacent macro block is intra coded data or does not exist within the picture or slice, the value of motion vector for the motion compensation block E is zero, whereby the motion compensation block E is regarded to refer to the reference frame different from the motion compensation blocks A, B, C and D.

Also, when any one of the motion compensation blocks A, B and C refers to the same reference frame as the motion compensation block E, the motion vector of the motion compensation block A, B or C that refers to the same reference frame as the motion compensation block E is generated as the predictor.

Moreover, in other than the above cases, the median of the motion vectors for the motion compensation blocks A, B and C is generated as the predictor.

Referring to FIG. 6, a motion search at integer pixel precision will be firstly described below for the searching method for the motion vector as defined in the JVT coding method. In FIG. 6, "0" to "24" are represented as the integer pixels, and indicate a searching sequence in the motion search.

In FIG. 6, pixel 0 indicates the center of the motion vector search. In the JVT coding method, the predictor generated by the above method as shown in FIG. 5 is located at the center of search, and the motion vector is searched for spirally around this center by the amount of ±Search_Range.

In this case, in the JVT coding method, the motion search is also performed at fractional pixel precision. Referring to FIG. 7, this motion search of fractional pixel precision will be described below. In FIG. 7, "A" to "I" are represented as the integer pixels, "1" to "8" are represented as ½ pixels, and "a" to "h" are represented as ¼ pixels. The alphabets and numerals as denoted in FIG. 7 have no relevance with the alphabets and numerals as denoted in other figures.

In FIG. 7, when the pixel E is detected as the optimal motion vector through the motion search of integer pixel precision, the ½ pixels 1 to 8 around the pixel E are searched in numerical order. As a result of this search, when the pixel 7 is detected as the optimal motion vector information, for example, the ¼ pixels a to h around the pixel E are searched in numerical order.

In this way, in the motion prediction compensation process of the JVT coding method, for all the macro blocks, the motion vector is searched for employing a plurality of reference frames while sequentially changing each of the motion compensation blocks of block sizes, thereby increasing the processing load in the motion prediction compensation process. Therefore, in this invention, the processing load of the motion prediction compensation process is reduced without deteriorating the image quality as much as possible.

One embodiment of the invention will be described below with reference to the drawings.

(2) Configuration of Image Coding Device

Figure 8:
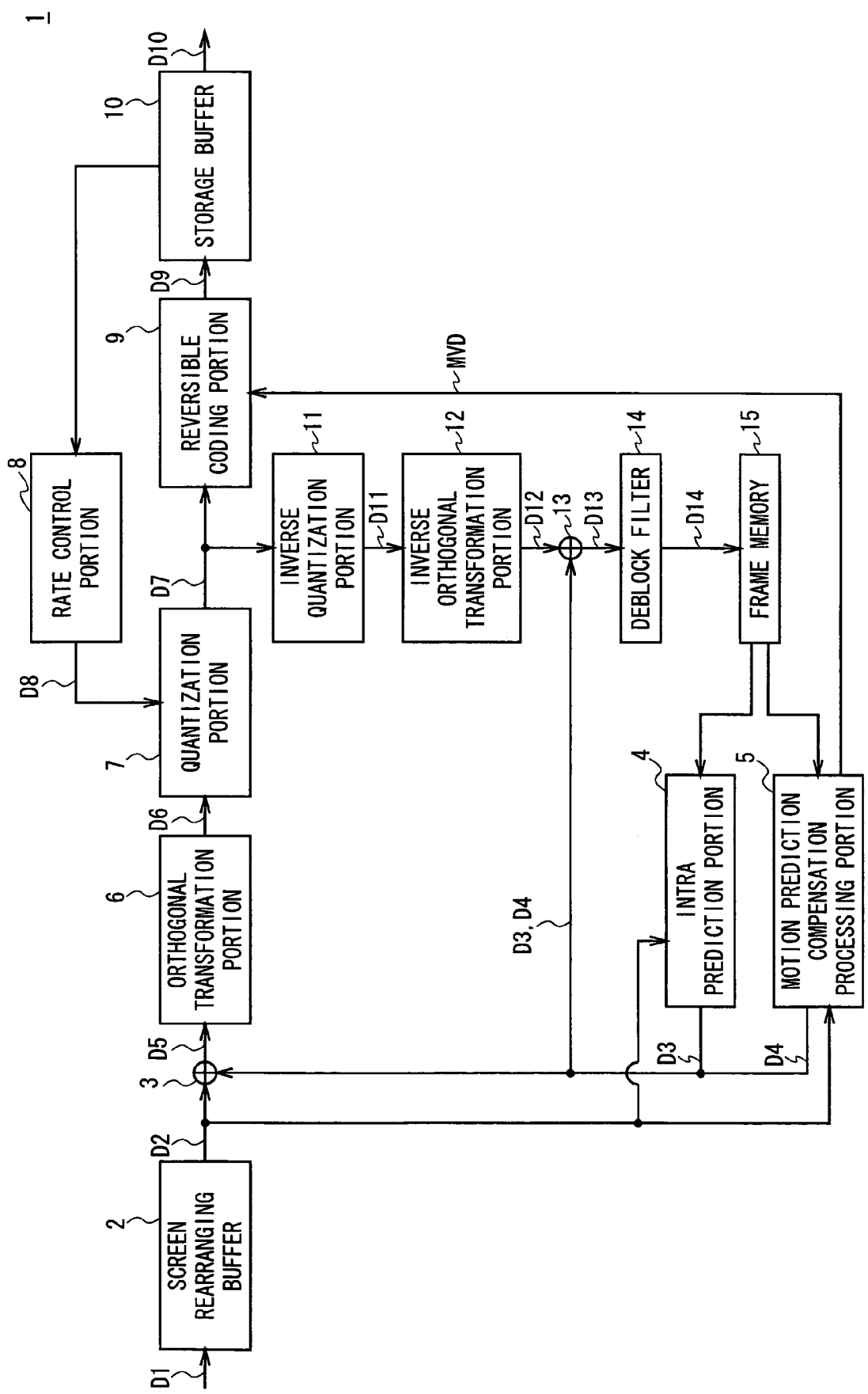
FIG. 8 is a block diagram showing the configuration of an image coding device.

In FIG. 8, 1 designates an image coding device conforming to the JVT coding method as a whole, in which data of moving picture (hereinafter referred to as dynamic image data) D1 formed by a plurality of frames is input from the outside, and the data amount of dynamic image data D1 is reduced efficiently.

More specifically, the image coding device 1 once stores the dynamic image data D1 supplied from the outside in an image rearrangement buffer 2, in which the frames of the dynamic image data D1 are rearranged in the coding order in accordance with a Group of Pictures (GOP) structure, and then read sequentially as the frame data D2 from the image rearrangement buffer 2.

Herein, the image coding device 1 sends the frame data D2 to an intra prediction portion 4, when the image type of frame data D2 read from the image rearrangement buffer 2 is I (Intra) frame.

The intra prediction portion 4 divides the frame based on the frame data D2 into pixel blocks of basis units (hereinafter referred to as macro blocks), and performs a process for predicting sequentially the pixel values for the macro blocks of prediction object, employing the macro blocks in the past, and sends the pixel values obtained sequentially as a result of the process as the prediction data D3 to an adder 3.

On the contrary, the image coding device 1 sends the frame data D2 to a motion prediction compensation processing portion 5, when the image type of frame data D2 read from the image rearrangement buffer 2 is other than I (Intra) frame.

Figure 2:
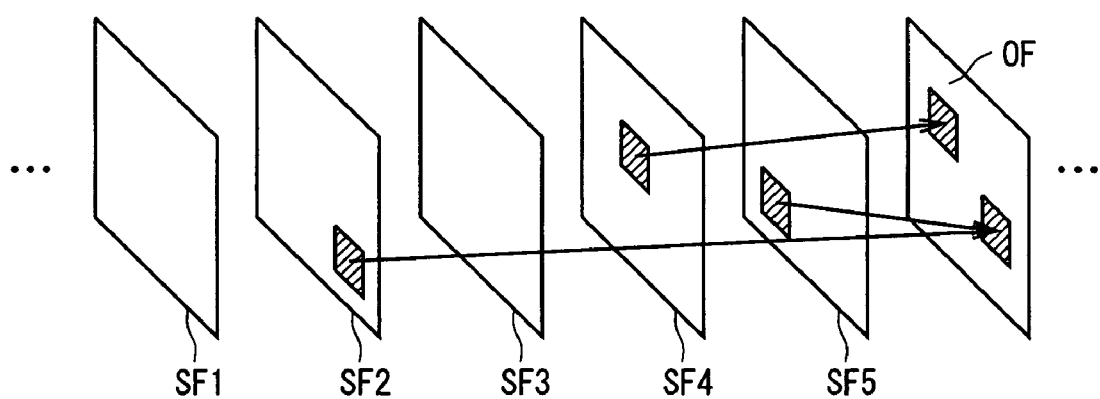
FIG. 2 is a diagrammatic view for explaining a multi reference frame.

The motion prediction compensation processing portion 5 divides the frame based on the frame data D2 into macro blocks, and performs a motion prediction compensation process for each of the motion compensation blocks of plural block sizes as described above and shown in FIG. 5, employing plural reference frames (FIG. 2) in the future or the past for the current frame.

In this case, the motion prediction compensation processing portion 5 detects a motion amount between the motion compensation block of prediction object and the motion compensation block within a predetermined reference frame most approximate to the pixel value of the motion compensation block as the motion vector, and performs a motion prediction process for calculating a difference value between the detected motion vector and the predictor (e.g., median value) based on the motion compensation block adjacent to the motion compensation block in the above way as shown in FIG. 1, whereby the difference value is sequentially sent as the motion vector information MVD to a reversible coding portion 9.

Also, the motion prediction compensation processing portion 5 performs a motion compensation process for shifting the pixel of motion compensation block in accordance with the motion vector, and sends sequentially the pixel value of shifted pixel as the predicted data D4 to the adder 3.

The adder 3 calculates the prediction residual by subtracting the prediction data D3 or D4 sequentially supplied from the intra prediction portion 4 or the motion prediction compensation processing portion 5 as a result of prediction made by the prediction method according to the image type in this way from the corresponding frame data D2, and sends this prediction residual as the difference data D5 to an orthogonal transformation portion 6.

The orthogonal transformation portion 6 performs an orthogonal transformation process such as a discrete cosine transform for the difference data D5 to generate the orthogonal transformation coefficient data D6, which is then sent to a quantization portion 7.

The quantization portion 7 performs a quantization process for the orthogonal transformation coefficient data D6 in accordance with a quantization parameter D8 given through a predetermined feedback control process of a rate control portion 8 to generate the quantization data D7, which is then sent to a reversible coding processing portion 9 and an inverse quantization portion 11.

The reversible coding processing portion 9 performs a reversible coding process such as reversible coding and arithmetical coding for the quantization data D7 and the corresponding motion vector information MVD to generate the coded data D9, which is stored in a storage buffer 10. This coded data D9 is read from the storage buffer 10 at a predetermined timing, and sent to the rate control portion 8 or the outside.

In this way, the image coding device 1 generates the coded data D9 with smaller data amount than the dynamic image data D1 by performing various processes using the high correlation between spatially or temporally adjacent pixels.

On the other hand, the inverse quantization portion 11 performs an inverse quantization process for the quantization data D7 given from the quantization portion 7 to restore the orthogonal transformation coefficient data D11 corresponding to the orthogonal transformation coefficient data D6, which is then sent to an inverse orthogonal transformation portion 12.

The inverse orthogonal transformation portion 12 performs an inverse orthogonal transformation process for the orthogonal transformation coefficient data D11, and restores the difference data D12 corresponding to the difference data D5, which is then sent to an adder 13.

The adder 13 sequentially adds the prediction data D3 or D4 corresponding to the difference data D12 to locally regenerate the frame data D13 corresponding to the frame data D2, which is then sent to a deblock filter 14.

The deblock filter 14 filters a distorted part in the frame based on the frame data D13 to be smoother and stores the frame data as the data of reference frame (hereinafter referred to as reference frame data) D14 that is a part of the multi reference frame as described above and shown in FIG. 2 in a frame memory 15, as needed, when there is a distortion between adjacent blocks divided by the motion prediction compensation processing process 5. This reference frame data D14 is read by the motion prediction compensation portion 5 and employed to sequentially predict the pixel value of each motion compensation block in the frame data D2.

In this way, in this image coding device 1, the pixel values of motion compensation block belonging to the frame of processing object are predicted employing the plurality of reference frames that are temporally different. Thereby, even when the reference frame immediately before the frame of processing object is unpredictable due to a camera flash, it can be predicted employing other frames as the reference frames. Consequently, the coding efficiency is improved by avoiding a wasteful amount of operation in the prediction.

In addition, the image coding device 1 makes the prediction employing the reference frame smoothed by removing beforehand the distortion, avoiding the lower prediction precision due to distortion. Consequently, the coding efficiency is improved by avoiding a wasteful amount of operation in the prediction.

(3) Motion Prediction Process of Motion Prediction Compensation Processing Portion 5

The processing contents of the motion prediction process in the motion prediction compensation processing portion 5 will be described below.

Figure 9:
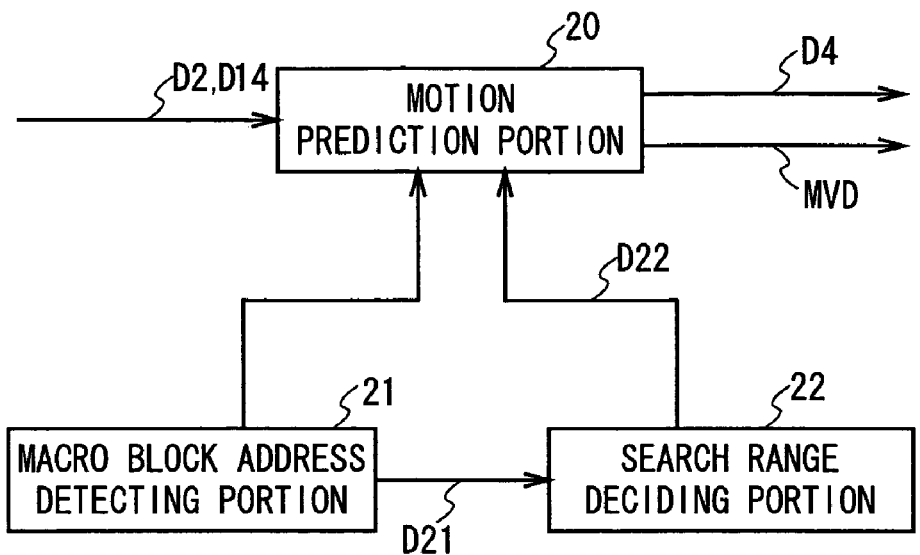
FIG. 9 is a block diagram showing the configuration of a motion prediction compensation processing portion.

The processing contents of the motion prediction process are functionally classified into a motion predicting portion 20 for generating the motion vector information MVD of the motion compensation block of prediction object (hereinafter referred to as a prediction block), a macro block address detecting portion 21 for detecting the address of macro block containing the prediction block, and a search range deciding portion 22 for deciding a range for searching for the motion vector of the prediction block (hereinafter referred to as a motion search range), as shown in FIG. 9. In the following, the motion prediction portion 20, the macro block address detecting portion 21 and the search range deciding portion 22 will be described.

(3-1) Processing of Motion Predicting Portion 20

The motion predicting portion 20 stores the frame data D2 given from the image rearrangement buffer 2 (FIG. 8) and one or more reference frame data D14 stored in the frame memory 15 at this time in an internal memory, and divides the frame based on the frame data D2 and the reference frame based on the reference frame data D14 into macro blocks.

In this state, the motion predicting portion 20 sequentially generates the motion vector information MVD for each motion compensation block of each block sizes as shown in FIG. 1, employing the plurality of reference frames (FIG. 2), for each macro block within the frame.

In practice, in generating the motion vector information MVD for the certain prediction block having the same block size as the macro block, for example, the motion predicting portion 20 firstly generates the predictor of the motion vector for the prediction block, based on the motion vector already detected for the surrounding motion compensation blocks of block size corresponding to the prediction block, in the above way as shown in FIG. 5. Accordingly, this predictor reflects the tendency of motion in the dynamic image blocks around the prediction block.

When this predictor is located at the central position (hereinafter referred to as a search center) in predetermined motion search range, the motion predicting portion 20 decides the predictor directly as the search center, when the position of image block on the reference frame corresponding to the position of prediction block (i.e., position where the motion vector is (0, 0), hereinafter referred to as a motion zero position) is not included within the motion search range.

On the contrary, if the motion zero position is not included within the motion search range when the predictor is located at the search center in the motion search range, the motion predicting portion 20 performs a process for shifting the predictor (hereinafter referred to as a predictor correcting process) until the motion zero position is included within the motion search range, and decides the corrected predictor (hereinafter referred to as a corrected predictor) as the search center.

Then, the motion predicting portion 20 detects, as the optimal motion vector, the motion vector for the motion compensation block most approximate to the pixel value of prediction block, such as the motion vector for the motion compensation block with the least sum of absolute values of differences from the pixel value of prediction block, in the motion search range with the search center decided in this way, and generates the difference value between the detected motion vector and the predictor of prediction block as the motion vector information MVD, which is then sent to the reversible coding processing portion 9 (FIG. 8).

In this way, the motion predicting portion 20 searches for the motion vector in a state where the motion zero position is included within the search range at any time. Thereby, even when the actual motion around the prediction block is dispersed in multiple directions, the motion vector for the prediction block can be detected at high precision.

(3-2) Processing of Macro Block Address Detecting Portion 21

Figure 10:
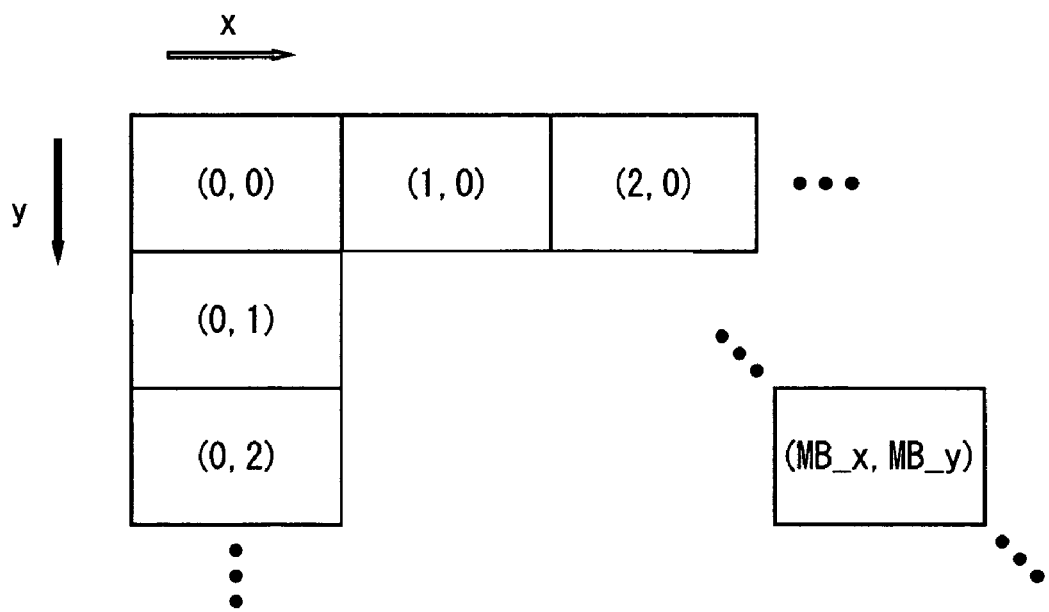
FIG. 10 is a diagrammatic view for explaining the detection of macro block address.

The macro block address detecting portion 21 monitors the frame data D2 stored in the internal memory of the motion predicting portion 20 at any time, detects the horizontal (x direction) and vertical (y direction) address (MB_x, MB_y) of the macro block including the prediction block of processing object at present in the motion predicting portion 20 with reference to a left upper corner of the frame based on the frame data D2, the detected result being sent as the data (hereinafter referred to as address detection data) D21 to the search range deciding portion 22, as shown in FIG. 10.

(3-3) Processing of Search Range Deciding Portion 22

The search range deciding portion 22 decides a first motion search range or a second motion search range narrower than the first motion search range, which is preset, based on the address (MB_x, MB_y) represented in the address detection data D21, employing a function f according to the address (MB_x, MB_y) as given in the following.

$$F(MB\_x, MB\_y) \quad (9)$$

More specifically, the search range deciding portion 22 has the function f as defined in the Formula (9) in accordance with the following formula $$MB\_x \%2 == 0 \text{ and } MB\_y \%2 == 0 \quad (10)$$

or the following formula $$MB\_x \%2 == -1 \text{ and } MB\_y \%2 == 1 \quad (11)$$

where the residual of dividing by 2 is %2.

And the search range deciding portion 22 decides the first search range SR1 when the residuals %2 of diving by 2 the MB address in the x direction (MB_x) and the MB address in the y direction (MB_y) are divisible (i.e., "0") or indivisible (i.e., "1"), as a result of calculation from Formula (10) and Formula (11), or otherwise decides the second search range SR2, in which the decision is sent as the search range decided data D22 to the motion predicting portion 20.

Figure 11:
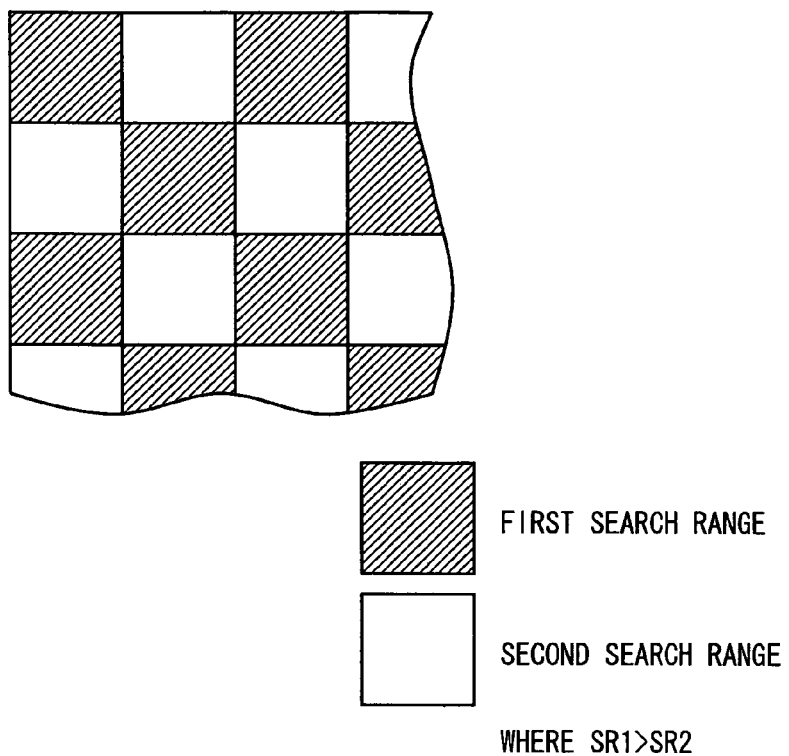
FIG. 11 is a diagrammatic view for explaining the decision of motion search range.

Accordingly, the search range deciding portion 22 allows the motion predicting portion 20 to search each macro block within the frame in the second search range SR2 narrower than the first search range SR1 at every other pixel in the horizontal direction (x direction) and the vertical direction (y direction), as shown in FIG. 11.

As a result, the motion prediction compensation portion 20 performs the motion prediction process at every other pixel in the second search range narrower than the first search range SR1, reducing the processing load in sequentially searching the macro block for the motion vector in each prediction block of each block size.

Since the motion prediction compensation portion 20 searches the motion search range SR1 or SR2 with the predictor reflecting the tendency of motion around the prediction block as the search center, the motion vector is detected even when the motion of pixel in the prediction block is large. Thereby, the motion vector is searched for in the second motion search range SR2 narrower than the first motion search range SR1 without lower prediction precision.

In this embodiment, when deciding the second search range SR2 according to the Formula (10) or (11), the search range deciding portion 22 generates the control data D23 to stop the predictor correcting process of the motion predicting portion 20 and sends it together with the search range decision data D22 to the motion predicting portion 20.

As a result, the motion prediction compensation portion 20 has the reduced processing load in searching for the motion vector, even if the pixel value of prediction block is not included in the motion search range SR2, when the predictor is located at the search center of the second motion search range SR2, because the predictor correcting process is not performed.

In this case, the motion prediction compensation portion 20 searches for the motion vector in the motion search range SR1 wider than the motion search range SR2, for the macro blocks around the macro block containing each motion compensation block searched in the motion search range SR2, whereby the predictor correcting process is covered in the first search range SR1 around the second motion search range SR2, even if it is not performed in the motion search range SR2, as shown in FIG. 11.

In this way, in predicting the pixel values of macro blocks, the motion prediction compensation processing portion 5 reduces the processing load of the motion prediction process by adaptively switching between the motion search ranges SR1 and SR2 and the presence or absence of the predictor correcting process according to the address of the macro block of processing object, without causing lower prediction precision.

(4) Operation and Effect

In the above constitution, this motion prediction compensation processing portion 5 detects the address (MB_x, MB_y) of macro block contained in the prediction block, and decides the motion search range SR1 or SR2 according to the detected address (MB_x, MB_y).

In this state, the motion prediction compensation processing portion 5 generates the predictor based on the motion vector already detected for the surrounding motion compensation block of block size corresponding to the prediction block, and searches for the motion vector in the motion search range SR1 or SR2 with this predictor as the center.

Accordingly, this motion prediction compensation processing portion 5 performs the motion prediction process in the second search range SR2 narrower than the first motion search range SR1, greatly reducing the processing load in sequentially searching for the motion vector for each motion compensation block of each block size for the macro block.

In addition, since the motion prediction compensation processing portion 5 searches for the motion vector with the predictor reflecting the tendency of motion around the prediction block as the search center, the motion vector is detected even when the motion of pixels of the prediction block is large. Hence the lower prediction precision is prevented even if the motion vector is searched for in the second motion search range SR2 narrower than the first motion search range SR1.

Also, the motion prediction compensation processing portion 5 decides the second search range SR2 only when both the horizontal and vertical addresses (MB_x, MB_y) are not even or odd, whereby the search range SR1 or SR2 is decided with a smaller amount of computation.

In this case, since the first search range SR1 and the second search range SR2 narrower than the first search range SR1 are alternately decided, the prediction is covered by the first search range SR1 wider than the second search range SR2 even if the second search range SR2 is very narrow. Thereby, the difference between the first search range SR1 and the second search range SR2 can be relatively large, so that the processing load in searching the second search range SR2 is further reduced while suppressing the lower prediction precision.

Moreover, the motion prediction compensation processing portion 5 stops the predictor correcting process of the motion predicating portion 20, when the second search range SR2 is decided.

Accordingly, the motion prediction compensation processing portion 5 does not perform the predictor correcting process, further reducing the processing load in searching the second search range SR2.

With the above constitution, the motion search range SR1 or SR2 is decided in accordance with the address (MB_x, MB_y) of macro block contained in the prediction block, the motion vector is searched for in the motion search range SR1 or SR2 around the predictor based on the surrounding motion compensation block corresponding to the prediction block, whereby the processing load is reduced by performing the prediction process in the second search range SR2 narrower than the first motion search range SR1. Moreover, the motion vector is searched for with the predictor reflecting the tendency of motion around the prediction block as the search center, whereby the lower prediction precision is prevented and the processing efficiency as the overall coding process is enhanced.

(5) Other Embodiments

In the above embodiment, as the address detecting means for detecting the address of object pixel block, the address (MB_x, MB_y) of the macro block containing the prediction block of processing object at present in the motion predicating portion 20 is detected with reference to the left upper corner of the frame based on the frame data D2 stored in the internal memory of the motion predicating portion 20. However, the invention is not limited thereto, but the address (MB_x, MB_y) of the macro block containing the prediction block may be detected with reference to other than the left upper corner. Also, the pixel block other than the macro block may be detected.

Figure 12:
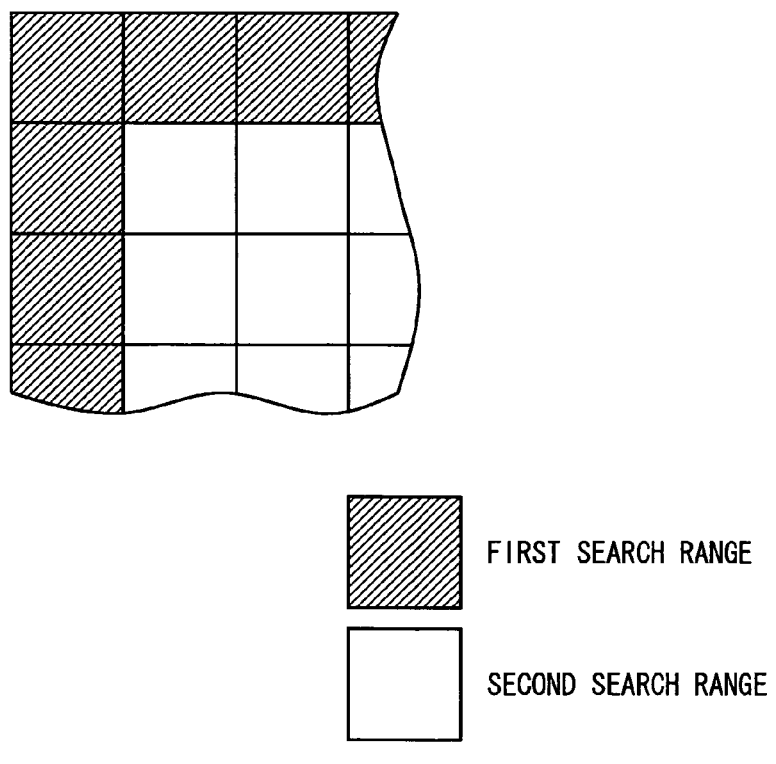
FIG. 12 is a diagrammatic view for explaining the decision of motion search range according to another embodiment of the invention.

Also, in the above embodiment, as the search range deciding means for deciding the first search range or the second search range in accordance with the address of object pixel block, the search range deciding portion 22 for deciding alternately the first search range SR1 or the second search range SR2 at every other pixel in the horizontal and vertical directions within the frame is applied in this invention. However, the invention is not limited thereto, but the first search range SR1 may be decided for the macro blocks around the frame, and the second search range SR2 may be decided for other macro blocks, as shown in FIG. 12. In this case, the processing load is smaller than in the above embodiment, because the first search range SR1 or the second search range SR2 is switched less frequently.

Further, in the above embodiment, as the search range deciding means for deciding the first search range or the second search range in accordance with the address of object pixel block, the search range deciding portion 22 for deciding alternately the first search range SR1 or the second search range SR2 at every other pixel in the horizontal and vertical directions within the frame is applied in this invention. However, the invention is not limited thereto, but the first search range SR1 may be decided for the macro block corresponding to the initial position of the slice, and the second search range SR2 may be decided for other macro blocks. In this case, the processing load is smaller than in the above embodiment, because the first search range SR1 or the second search range SR2 is switched less frequently.

Further, in the above embodiment, as the search range deciding means for deciding the first search range or, the second search range in accordance with the address of object pixel block, the search range deciding portion 22 for deciding alternately the first search range SR1 or the second search range SR2 at every other pixel in the horizontal and vertical directions within the frame is applied in this invention. However, the invention is not limited thereto, but a search range wider than the first search range SR1 may be decided when the address is "0" (i.e., macro block for which the motion prediction compensation process is firstly performed among the macro blocks within the object frame). In this case, the prediction precision is further enhanced.

Further, in the above embodiment, as the motion vector searching means for searching for the motion vector from the search range decided by the search range deciding means around the predictor of the motion vector generated based on the surrounding pixel blocks adjacent to the object pixel block, the motion predicting portion 20 for performing a process for correcting the prediction value is applied in the invention, if the position (motion zero position) of the pixel block on the reference frame corresponding to the position of prediction block is not included in the first search range SR1, when the predictor is located at the center of the search range. However, this invention is not limited thereto, but the correcting process may not be performed.

Also, in this invention, the rate at which the position of predictor is shifted may be changed according to the rate of difference between the first search range SR1 and the second search range SR2. More specifically, as there is greater difference between the first search range SR1 and the second search range SR2, the position (motion zero position) of pixel block on the reference frame corresponding to the position of prediction block is approached more closely, thereby reducing the processing load in searching the second search range SR2 while suppressing the lower prediction precision properly.

Moreover, in the above embodiment, the motion prediction compensation device for predicting and compensating the motion amount of each of the plurality of pixel blocks into which the object frame in consecutive frames is divided, employing the reference frame that is the frame in the future or past for the object frame, the prediction compensation processing portion 5 for performing the prediction compensation process conforming to the JVT coding method is applied in this invention. However, this invention is not limited thereto, but may be applied to the motion prediction compensation device for performing the motion prediction compensation process conforming to various other coding methods, such as MPEG2.

As described above, with the invention, in predicting and compensating the motion amount of each of the plurality of pixel blocks into which the object frame in consecutive frames is divided, employing the reference frame that is the frame in the future or past for the object frame, the address of object pixel block serving as the pixel block of prediction object among the plurality of pixel blocks is detected, the first search range or the second search range narrower than the first search range is decided as the search range of the motion vector for the object pixel block on the reference frame according to the detected address, and the motion vector is searched for from the decided search range around the predictor of the motion vector generated based on the surrounding pixel blocks adjacent to the object pixel block, whereby the processing load is reduced because the motion vector is searched for in the second search range narrower than the first motion search range, and the lower prediction precision is prevented because the search is made around the predictor reflecting the tendency of motion around the prediction block, so that the processing efficiency of the overall coding process is enhanced.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A motion prediction compensating device for predicting and compensating a motion amount of pixel blocks, the pixel blocks forming an object frame, the motion prediction compensating device comprising:

address detecting means for detecting horizontal and vertical address values of an object pixel block;

search range deciding means for selecting, based on a result of processing the horizontal and vertical address values according to a mathematical function, a first search range or a second search range narrower than the first search range as the search range of a motion vector for the object pixel block; and motion vector searching means for searching for the motion vector from the selected search range around a predictor of the motion vector generated based on pixel blocks adjacent to the object pixel block, and correcting the predictor until the predictor is located at a central position of the selected search range, the correcting of the predictor occurring at a rate based on a rate of difference between the first search range and the second search range;

wherein the search range deciding means selects the first search range if the horizontal and vertical addresses are both even numbers or both odd numbers, and selects the second search range if the horizontal and vertical addresses form an even and odd pairing; and wherein the search range deciding means generates control data to stop correction of the predictor by the motion vector searching means when the second search range is selected.

2. A motion prediction compensating method for predicting and compensating a motion amount of pixel blocks, the pixel blocks forming an object frame, the motion prediction compensating method comprising:

detecting horizontal and vertical address values of an object pixel block;

selecting, based on a result of processing the horizontal and vertical address values according to a mathematical function, a first search range or a second search range narrower than the first search range as the search range of a motion vector for the object pixel block; and searching for the motion vector from the selected search range around a predictor of the motion vector generated based on pixel blocks adjacent to the object pixel block;

correcting the predictor until the predictor is located at a central position of the selected search range, the correcting of the predictor occurring at a rate based on a rate of difference between the first search range and the second search range;

selecting the first search range if the horizontal and vertical addresses are both even numbers or both odd numbers;

selecting the second search range if the horizontal and vertical addresses form an even and odd pairing; and generating control data to stop correction of the predictor when the second search range is selected.

* * * * *